United States Patent
Koshino et al.

[11] Patent Number: 6,160,781
[45] Date of Patent: Dec. 12, 2000

[54] DISC TRANSFER MECHANISM

[75] Inventors: Katsuhiko Koshino, Neyagawa; Takeshi Nakamura, Hirakata, both of Japan

[73] Assignee: Matsushita Electric Industrial Co., Ltd., Japan

[21] Appl. No.: 09/238,590

[22] Filed: Jan. 28, 1999

[30] Foreign Application Priority Data

Jan. 30, 1998 [JP] Japan .................................. 10-17605

[51] Int. Cl.$^7$ .................................................. G11B 33/02
[52] U.S. Cl. .......................................................... 369/75.2
[58] Field of Search ................................ 369/75.1–75.2, 369/77.1–77.2, 178, 191–192

[56] References Cited

U.S. PATENT DOCUMENTS

| | | | |
|---|---|---|---|
| 5,844,874 | 12/1998 | Saito et al. ............................. | 369/77.1 |
| 5,864,529 | 1/1999 | Liao et al. ............................. | 369/77.1 |
| 5,878,013 | 3/1999 | Maeda et al. .......................... | 369/77.1 |
| 5,930,218 | 7/1999 | Mitsui et al. .......................... | 369/77.1 |
| 5,978,342 | 11/1999 | Ju et al. ................................. | 369/77.1 |

*Primary Examiner*—Allen T. Cao
*Attorney, Agent, or Firm*—Parkhurst & Wendel, L.L.P.

[57] ABSTRACT

It is an object of the present invention to provide a disc transfer mechanism that includes a simply configured tray to be moved and that is reliable in installing and removing a disc. When a tray (1) is drawn out as shown in FIG. 8(*a*), a positioning protrusion (33*a*) of a disc receiving member (23) determines a position at which a disc (34) is placed. The tray (1) is pushed in as shown in FIGS. 8(*b*) to 8(*c*) until a central hole (35) in the disc (34) reaches a position over a turntable (9). Subsequently, a disc receiving member (23) moves to the front end of the tray (1) relative to the movement of the tray to the internal end as shown in FIGS. 8(*d*) and (*e*) to enable the disc to be installed and removed stably.

2 Claims, 11 Drawing Sheets

DISC TRANSFER MECHANISM

FIELD OF THE INVENTION

The present invention relates to a disc transfer mechanism having a tray used to install and eject a disc.

BACKGROUND ART

The disc transfer mechanism described in Japanese Patent Application Laid-Open No. 63-191361 has a tray that moves in the horizontal direction between a disc installation and removal position at which a disc has been drawn out from the apparatus and a position at which the disc has been drawn into the apparatus body; and a disc holder provided on the tray and on which the disc is placed.

The apparatus body also includes a turntable that rotationally drives the disc, a damper that sandwiches the disc with the turntable, an optical pickup, and a traverse mechanism for moving the optical pickup in the radial direction of the disc.

The tray and the disc holder have such a relation as to be configured so that the tray moves in the horizontal direction to lead the central hole of the disc placed on the disc holder to a position immediately before the turntable, and so that when the tray further moves in the same direction toward the internal end, the disc holder starts descending toward the turntable and loads the disc on the turntable provided on a fixed side so that the disc is sandwiched by the turntable and the clamper.

In such a disc transfer mechanism, the disc holder configured on the tray makes the structure complicated and reduces the reliability of the disc installation and removal.

DISCLOSURE OF THE INVENTION

It is an object of this invention to provide a disc transfer mechanism that includes a simply configured tray to be moved and that is reliable in installing and removing a disc.

A disc transfer mechanism according to this invention is characterized in that a turntable elevates and lowers in response to the drawing-out and -back of a tray, in that the tray includes a disc receiving member that can abut on the outer circumference of a disc to restrict the position of the disc when it is set on the tray, and in that the restriction of the position by the disc receiving member is automatically cleared immediately before the end of loading.

This configuration provides a disc transfer mechanism that simplifies the configuration of the tray to be moved and that is reliable in installing and removing the disc.

The disc transfer mechanism set forth in claim 1 comprises: an elevating mechanism for elevating and lowering a turntable in response to the drawing-out and -back of a tray to allow the turntable to be installed on and removed from a disc placed on the tray; and a disc receiving member provided at the front end of the tray, and adapted to freely slide in the direction in which the tray is drawn out and back and to be urged toward the internal end of the tray, the disc receiving member having a positioning protrusion that can abut on the outer circumference of the disc being loaded; whereby the moment the central hole of the disc placed on the tray reaches a position over the turntable, the disc receiving member abuts on the fixed side and moves toward the front end of the tray relative to the movement of the tray toward the internal end thereof.

This configuration enables the disc to be stably installed and removed as by a conventional mechanism having a complicated tray structure, by providing the simply configured disc receiving member in the tray.

The disc transfer mechanism set forth in claim 2 is the mechanism according to in claim 1, wherein the tray has a small-diameter disc receiving portion formed by constructing in a large-diameter disc receiving portion a receiving surface lower than a large-diameter disc receiving surface, the disc receiving member has a large- and small-diameter disc positioning protrusions formed thereon, and the center of the small-diameter disc receiving portion is offset from the center of the large-diameter disc receiving portion toward the internal end of the tray.

According to this configuration, despite the use of the structure that elevates and lowers the turntable from and to the tray by an elevating mechanism any one of the small- and large-diameter discs can be stably installed and removed even if the amount of elevating or lowering operation of the turntable relative to the horizontal movement of the tray during the installation or removal of the large-diameter disc is the same as that during the installation or removal of the small-diameter disc.

DESCRIPTION OF THE EMBODIMENTS

Embodiments of this invention will be described below with reference to FIGS. 1 to 11.

Figure 1:
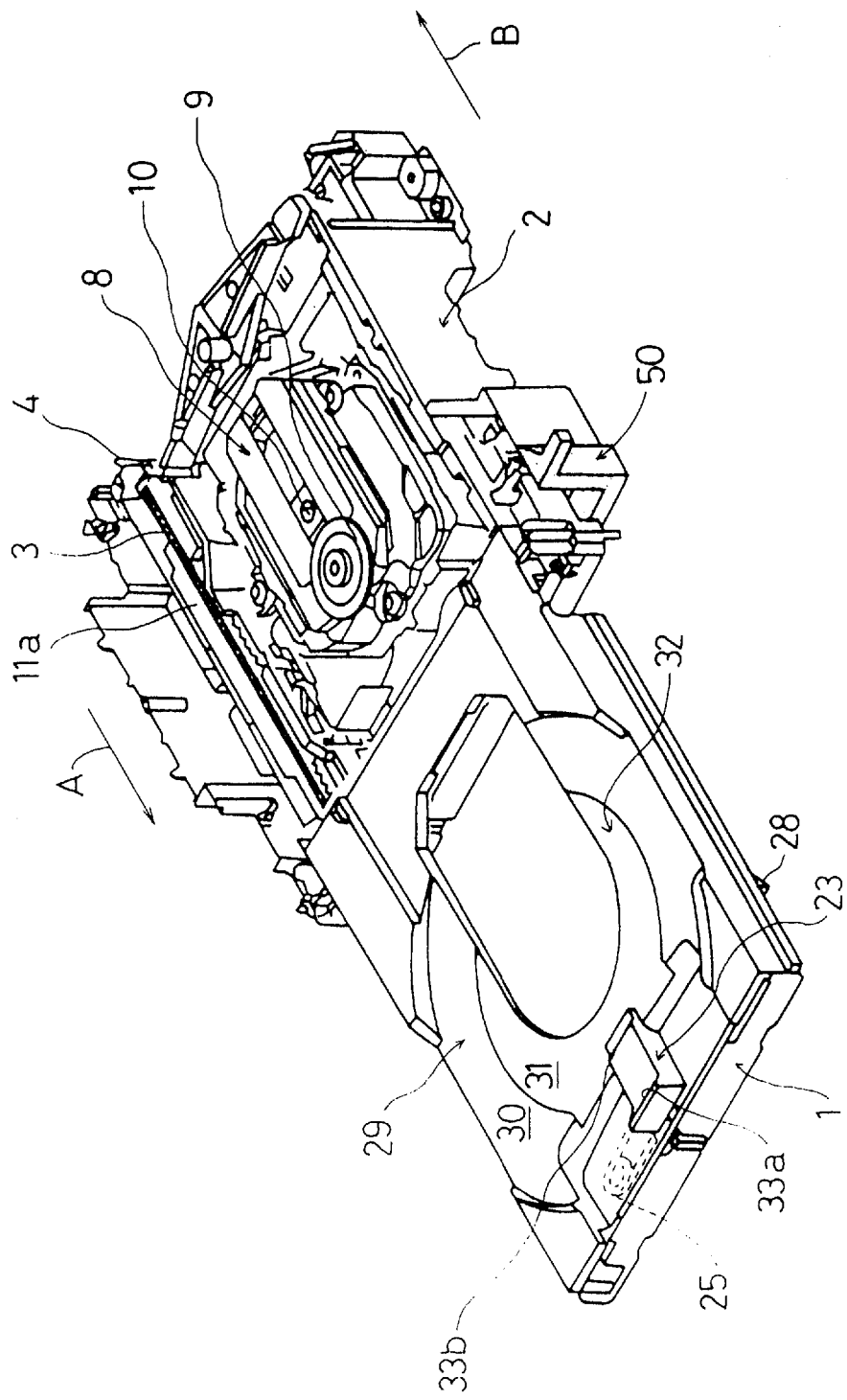
FIG. 1 is a perspective view showing a state in which a tray has been drawn out from a disc transfer mechanism according to an embodiment of this invention.
Figure 2:
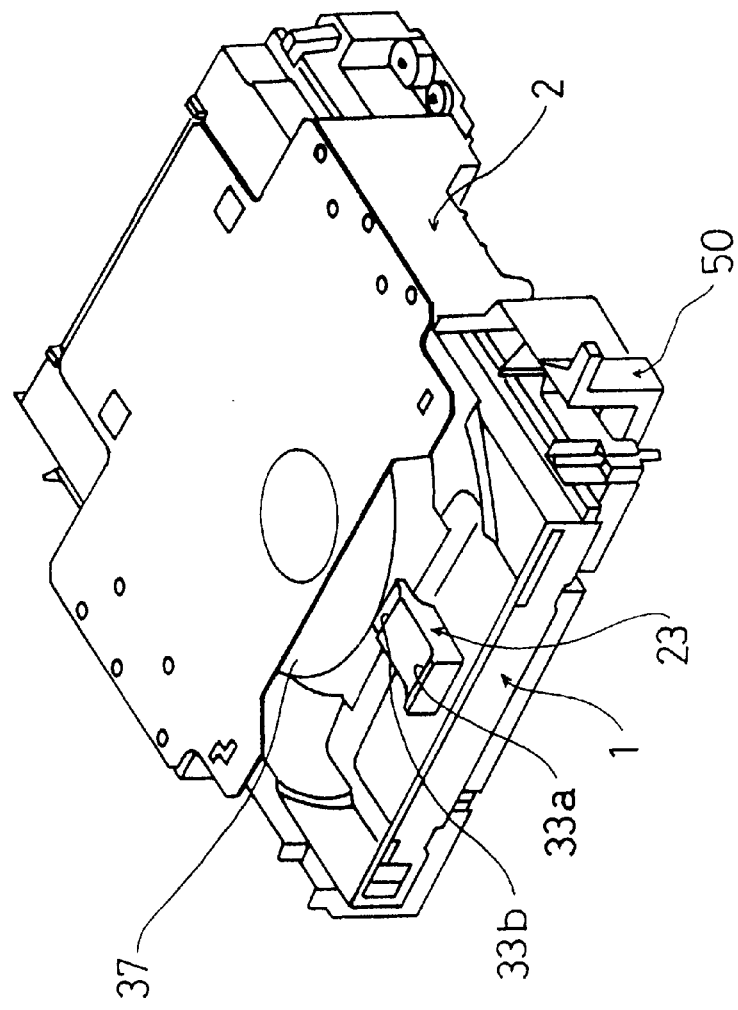
FIG. 2 is a perspective view showing a state in which the tray has been pushed back according to the same embodiment.

FIG. 1 shows a disc transfer mechanism in a disc installation and removal position in which a tray 1 has been drawn out from a base 2. FIG. 2 shows a state in which the tray 1 has moved in the horizontal direction to a loading completion position.

Figure 3:
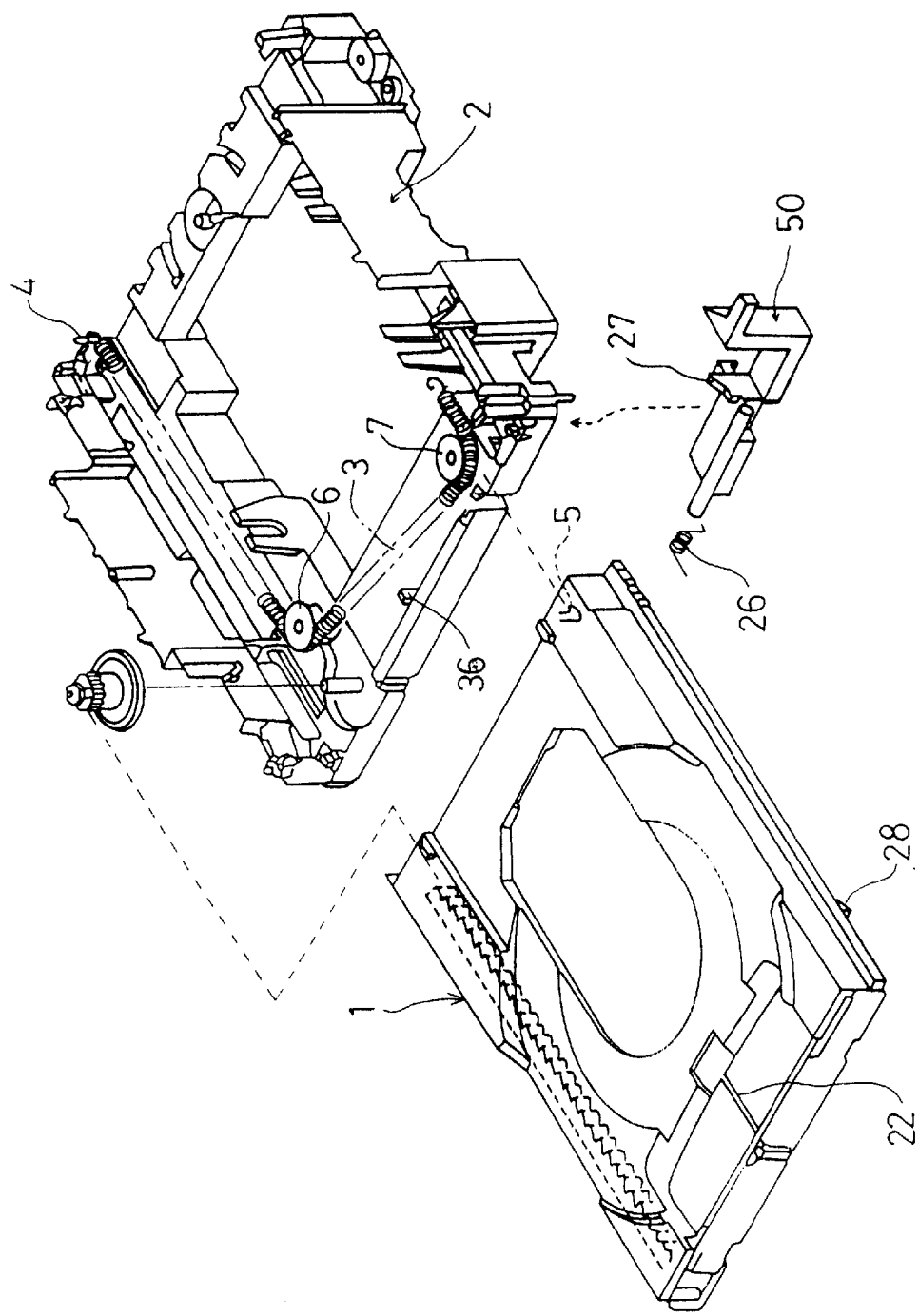
FIG. 3 is an exploded perspective view showing a state in which the tray has been removed from a base according to the same embodiment.

Further, in the disc transfer mechanism according to this embodiment, instead of the use of a motor, a tension spring 3 is passed between a spring engaging locking position 4 of the base 2 and a spring engaging locking portion 5 formed on the bottom surface of the internal end of the tray 1 in order to drive the tray 1, as shown in FIG. 3. The middle portion of the tension spring 3 passes through grooved rollers 6 and 7 pivotably supported on the base 2.

Reference numeral 8 denotes a playing apparatus that is a unit composed of a turntable 9 rotationally driving a disc, an optical pickup 10, and a traverse mechanism (not shown) for moving the optical pickup in the radial direction of the disc.

Figure 4:
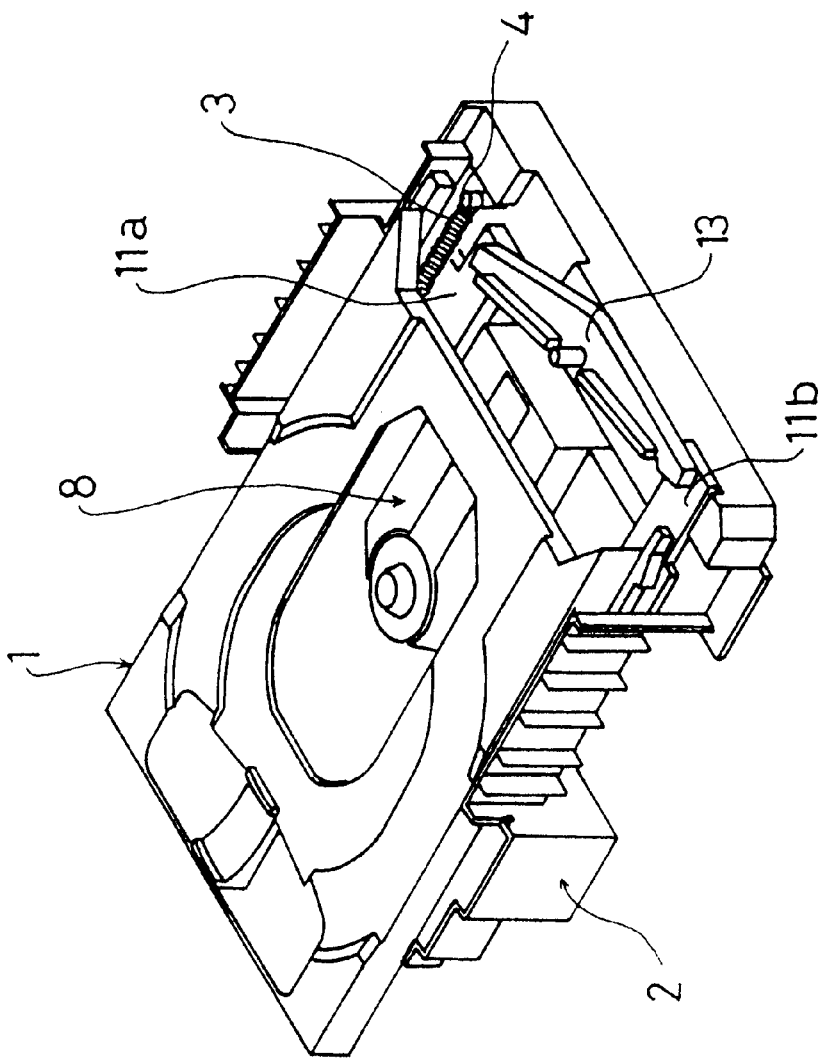
FIG. 4 is a perspective view showing the disc transfer mechanism according to the same embodiment as seen from the rear (the internal end) side.
Figure 5:
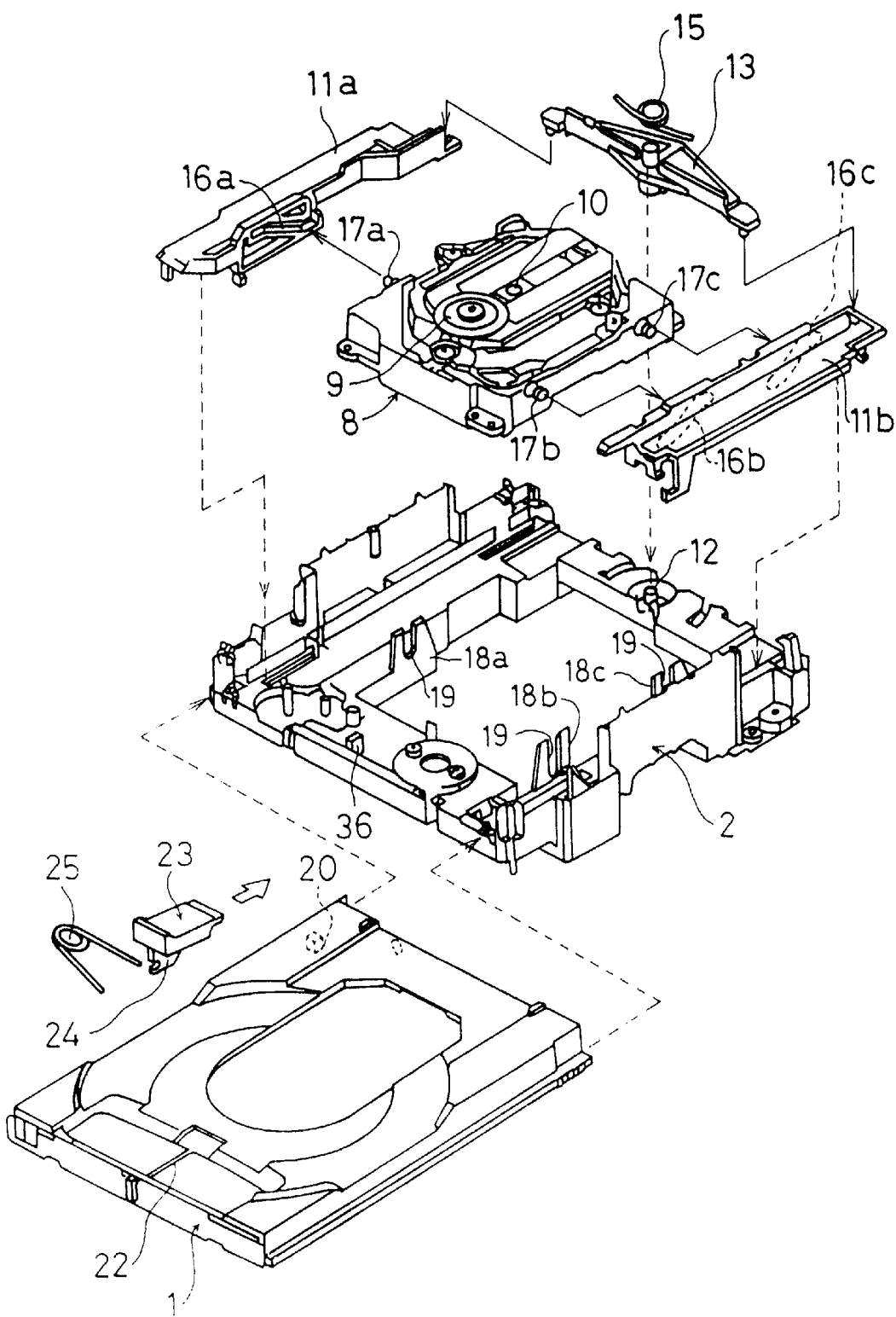
FIG. 5 is an exploded perspective view of the entire disc transfer mechanism according to the same embodiment.

As shown in FIGS. 4 and 5, sliders 11a and 11b are provided on the top surface of the base 2 at positions covered by the tray 1 so as to slide in the direction in which the tray 1 is drawn out and back. The internal ends of the sliders 11a and 11b are coupled together via a coupling lever 13 having its center pivotally supported on a shaft 12 of the base 2. A spring 15 installed between the coupling lever 13 and a protrusion 14 from the base 2 urges the coupling lever 13 in such a way as to push the slider 11a toward the front end of the base 2 (the direction shown by arrow A) and draw the slider 11b toward the internal end of the base 2 (the direction shown by arrow B).

A cam groove 16a is formed in a part of the inside of the slider 11a and close to its front end. Cam grooves 16b and 16c are formed inside the slider 11b and close to its front and internal ends, respectively. The cam grooves 16a and 16b extend in opposite directions, while the cam grooves 16b and 16c extend in the same direction.

Horizontal shafts 17a, 17b, and 17c are formed in a housing of the playing apparatus 8 and engage with vertical grooves 19 in guides 18a, 18b, and 18c formed on the base 2 to support the playing apparatus 8 over the base 2 so as to elevate and lower it. The tips of the horizontal shafts 17a to 17c engage with the cam grooves 16a to 16c.

Figures 6A, 6B, 6C, 6D:
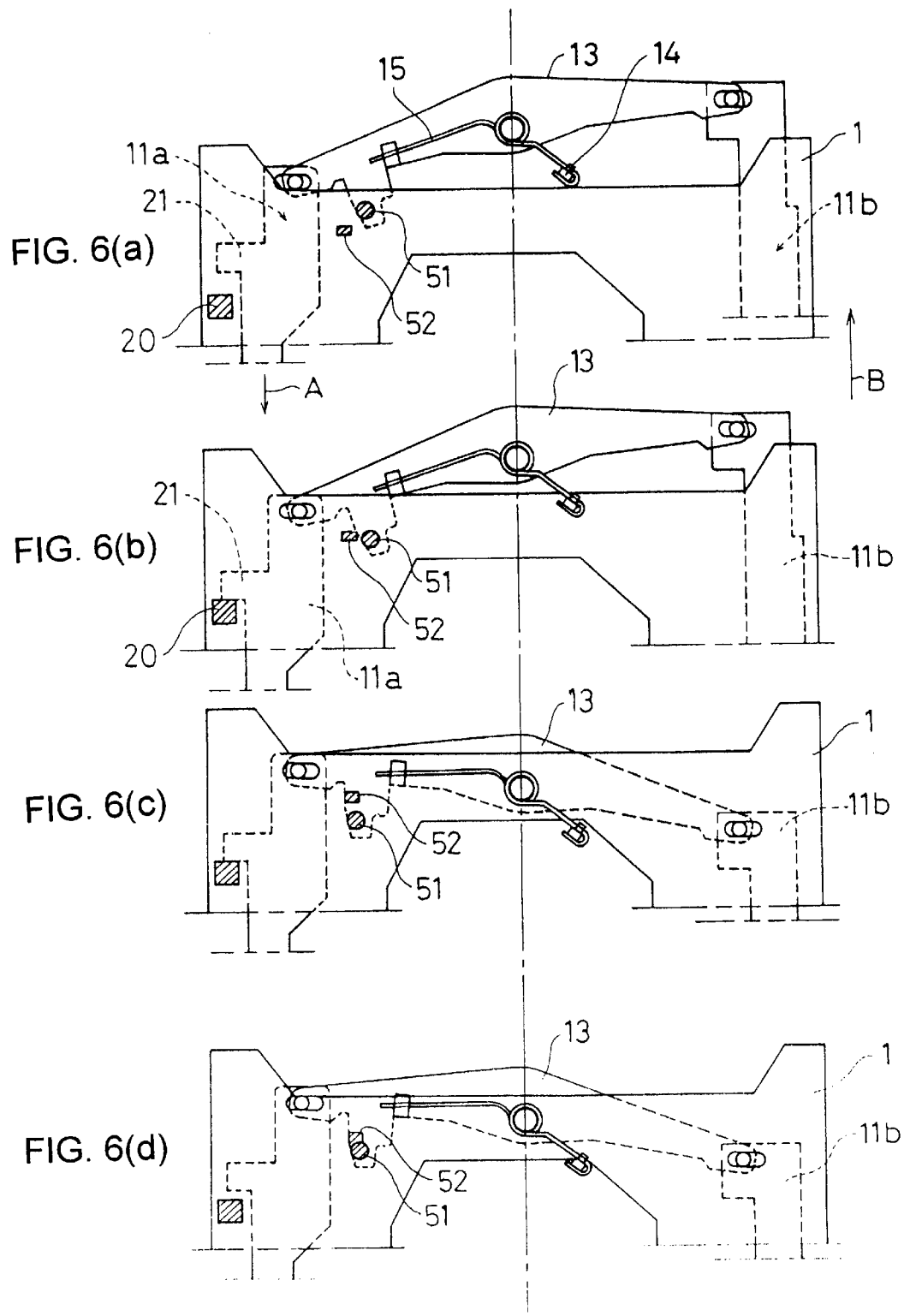
FIG. 6 is a plan view of the neighborhood of a coupling lever during a loading process according to the same embodiment.

When the tray 1 is pushed toward the internal end of the base 2 against the urging force of the tension spring 3, this configuration allows the sliders 11a and 11b to interlockingly slide through the process shown in FIGS. 6(a) to (c).

Specifically, when the tray 1 is pushed toward the internal end, the protrusion 20 formed on the bottom surface of the tray 1 as shown in FIG. 6(a) starts to engage with an engaging portion 21 of the slider 11a as shown in FIG. 6(b). When the tray 1 is further pushed in, the slider 11a slides toward the internal end (the direction shown by arrow B) while the slider 11b slides toward the front end (the direction shown by arrow A), as shown in FIG. 6(c). As the sliders 11a and 11b move in the longitudinal direction in response to the pushing-in of the tray 1, the housing of the playing apparatus 8 moves from a lowered position to an elevated position.

Figure 7:
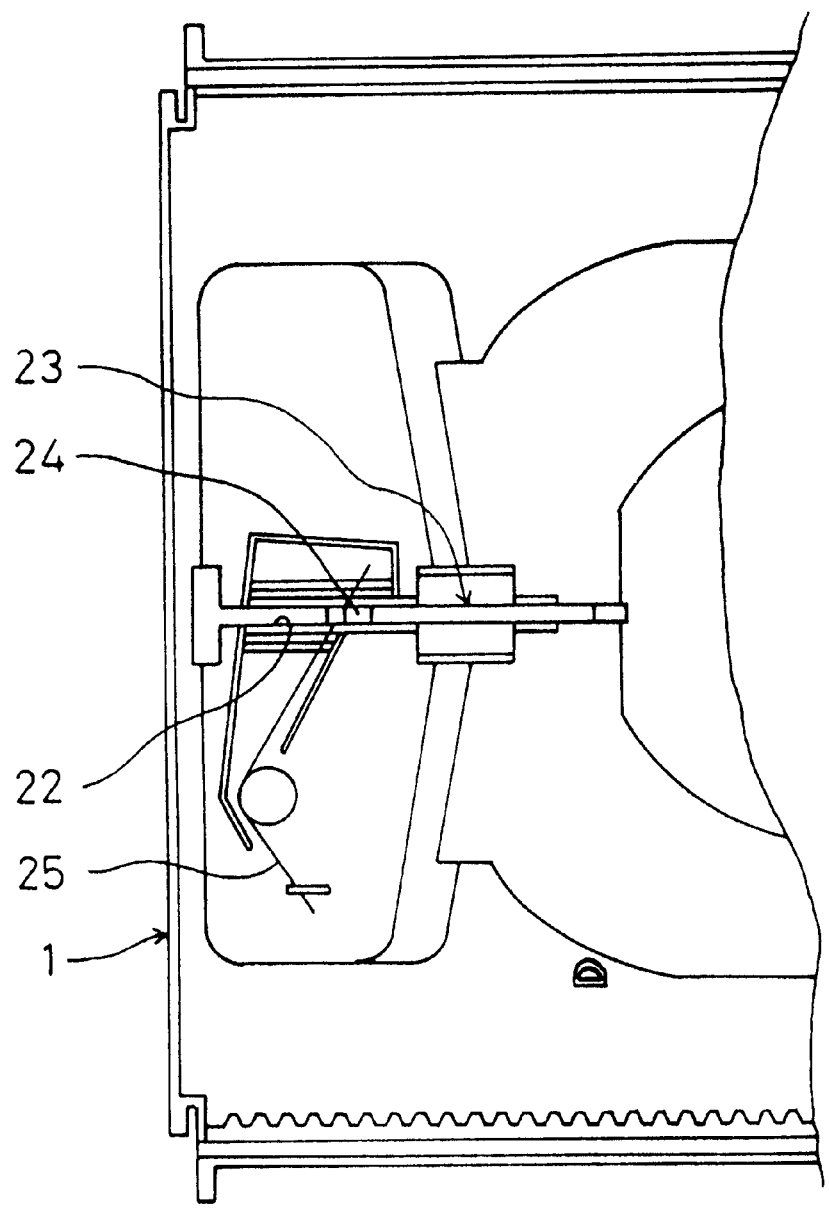
FIG. 7 is a plan view of the bottom surface of the front end portion of the tray according to the same embodiment.

As shown in FIG. 5, a slide hole 22 is drilled at the front end of the tray 1. A protrusion 24 formed on the bottom surface of a disc receiving disc receiving member 23 is inserted into the slide hole 22, and a spring 25 is installed on the bottom surface of the tray 1 between the tray 1 and the protrusion 24 of the disc receiving member 23 as shown in FIG. 7 to urge the disc receiving member 23 toward the internal end of the tray 1.

When the tray 1 reaches the internal end, a lock claw 27 formed on an operation lever 50 urged by a spring 26 provided on the base 2 is engaged with and locked by an engaging portion 28 provided at the front end of the tray 1. When the operation lever (not shown) provided on the base 2 is operated to rotationally move the lock claw 27 against the urging force of the spring 26, the lock claw 27 is disengaged from the engaging portion 28 of the tray 1 and the tray 1 returns to the disc installation and removal position due to the urging force of a tension spring 13. In this case, a protrusion 51 formed on the coupling lever 13 is located in such a way as to engage with a protrusion 52 formed on the bottom surface of the tray 1 as shown in FIG. 6(d). When the protrusions 51 and 52 are mutually disengaged, the sliders 11a and 11b and the tray 1 further move to move the housing of the playing apparatus 8 from the elevated position to the lowered position.

The mechanisms for moving the tray 1 in the horizontal direction relative to the base 2 and for elevating and lowering the playing apparatus 8 in response to this horizontal movement are configured as described above. The tray 1 is further configured as follows.

As shown in FIG. 1, the tray 1 includes a large-diameter disc receiving portion 29 and a small-diameter disc receiving portion 32 formed in the large-diameter disc receiving portion 29 and having a receiving surface 31 lower than a large-diameter disc receiving surface 30. Furthermore, A large- and small-diameter disc positioning protrusions 33a and 33b are formed in a disc receiving disc receiving member 23 slidably provided at the front end of the tray 1.

Figure 8:
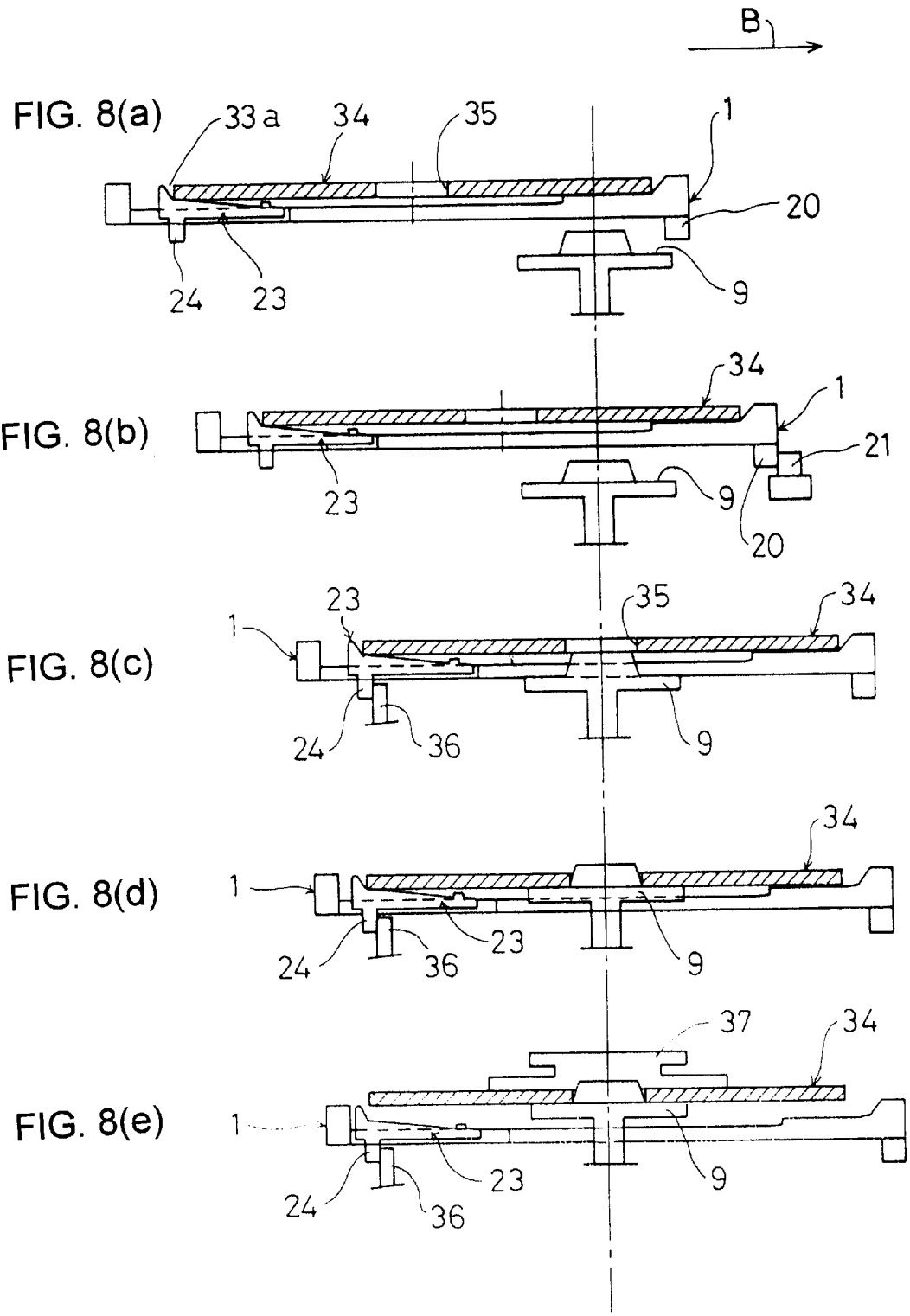
FIG. 8 is a sectional view showing the relationship between the tray, a disc and a turntable observed while a large-diameter disc is being loaded according to the same embodiment.

FIG. 8 shows a process for loading a large-diameter disc 34. The cam grooves 16a, 16b, and 16c are formed as follows.

In FIG. 8(a), the large-diameter disc 34 is placed on the tray 1 drawn to the disc installation and removal position. At this point, the large-diameter disc 34 is placed in the inside defined by the large-diameter disc positioning protrusion 33a and large-diameter disc receiving portion 29 of the disc receiving member 23.

When the tray 1 is pushed in against the tension spring 3 until its protrusion 20 abuts on the engaging portion 21 of the slider 11a as shown in FIG. 6(b), and the tray 1 is further pushed in toward the internal end. Then, in response to the horizontal movement of the tray 1 toward the internal end, the slider 11a slides toward the internal end, while the slider 11b slides toward the front end, thereby causing the playing apparatus 8 to start elevating. As shown in FIGS. 8(b) to (c), at the moment when the central hole 35 of the large-diameter disc placed on the tray 1 reaches a position over the turntable 9, the protrusion 24 of the disc receiving disc receiving member 23 abuts on an engaging piece 36 of the base 2. In this state, when the tray 1 is further pushed in toward the internal end, the relative position between the disc receiving member 23 and the tray 1 changes against the urging force of the spring 25, as shown in FIG. 8(d).

That is, until the central hole 35 of the large-diameter disc starts to engage with the turntable 9, the positioning protrusion 33a of the disc receiving member 23 accurately holds the large-diameter disc 34 on the tray 1 so as not to shift. When the turntable 9 starts to engage with the central hole 35 of the large-diameter disc 35, the protrusion 24 of the disc receiving member 23 rests at the same position as in FIG. 8(c) while abutting on the engaging piece 36, whereas only the tray 1 slides toward the internal end, with the relative relationship between the large-diameter disc 34 and the positioning protrusion 33a of the disc receiving member 23 remaining unchanged. In these stable conditions, the insertion of the turntable 9 into the central hole 35 of the large-diameter disc 34 is completed as shown in FIG. 8(d).

When in FIG. 8(d), the tray 1 is further pushed in toward the internal end, the playing apparatus 8 further elevates to allow the turntable 9 to lift the large-diameter disc 34 from the top surface of the tray 1, and the damper 37 and the turntable 9 sandwich the disc 34 therebetween to rotationally drive it, as shown in FIG. 8(e).

The terminals of the cam grooves 16a, 16b, and 16c are shaped in such a way that the tray 1 continues horizontal movement toward the internal end for a short period of time after the damper 37 and the turntable 9 sandwich the disc 34 therebetween.

Although the relative relationship between the tray 1 and the disc receiving disc receiving member 23 and the turntable 9 that can stably load the large-diameter disc 34 has been described above, this invention is also configured as follows to enable a small-diameter disc to be loaded stably.

In the tray 1, the small-diameter disc placement surface 31 is formed below the large-diameter disc placement surface 30. Timings for the tray 1 to be drawn out and back and for the playing apparatus 8 to elevate and lower are the same for both the large- and small-diameter discs.

If the center 38 of the small-diameter disc receiving portion 32 is identical to the center 39 of the large-diameter disc receiving portion 29, the difference in the height of the discs causes the tray 1 to shift between the position at which the bottom surface of a small-diameter disc aligns with the top surface of the turntable 9 and the position at which the turntable surface aligns with the bottom surface of the small-diameter disc. Accordingly, the center of the turntable 9 fails to align with the central hole of the disc, thereby precluding the small-diameter disc from being loaded stably.

Figure 9:
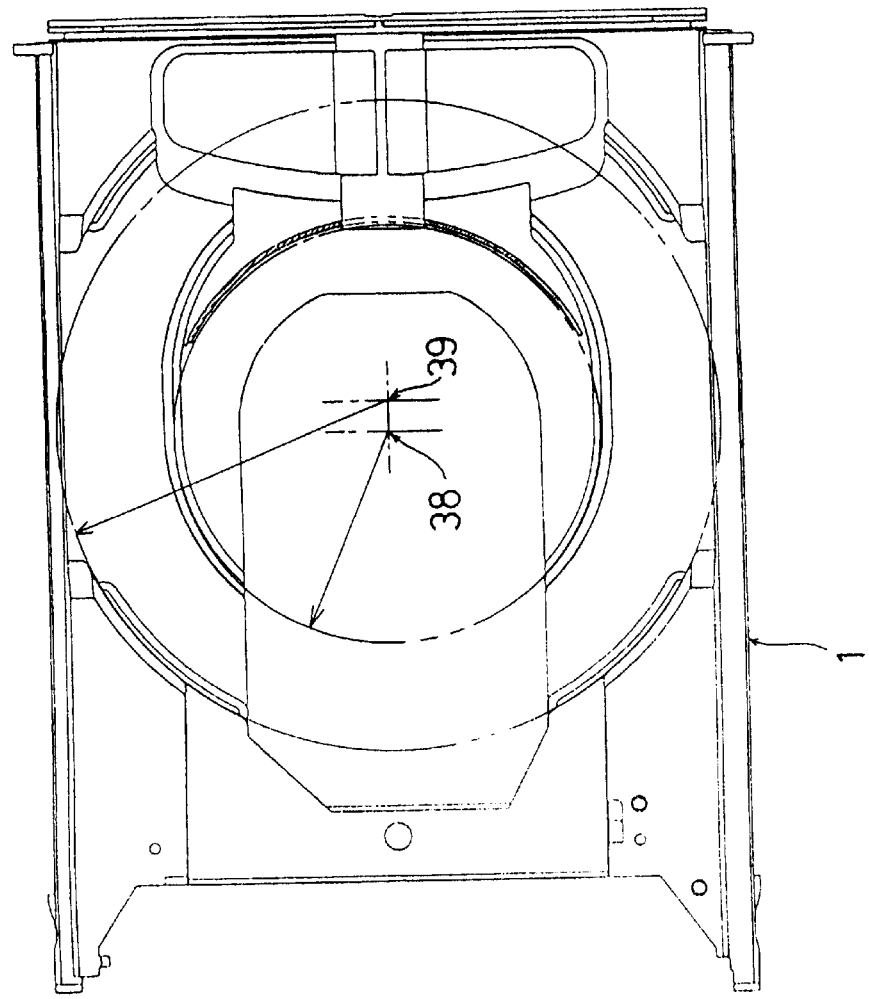
FIG. 9 is a plan view of the tray according to the same embodiment.
Figure 10:
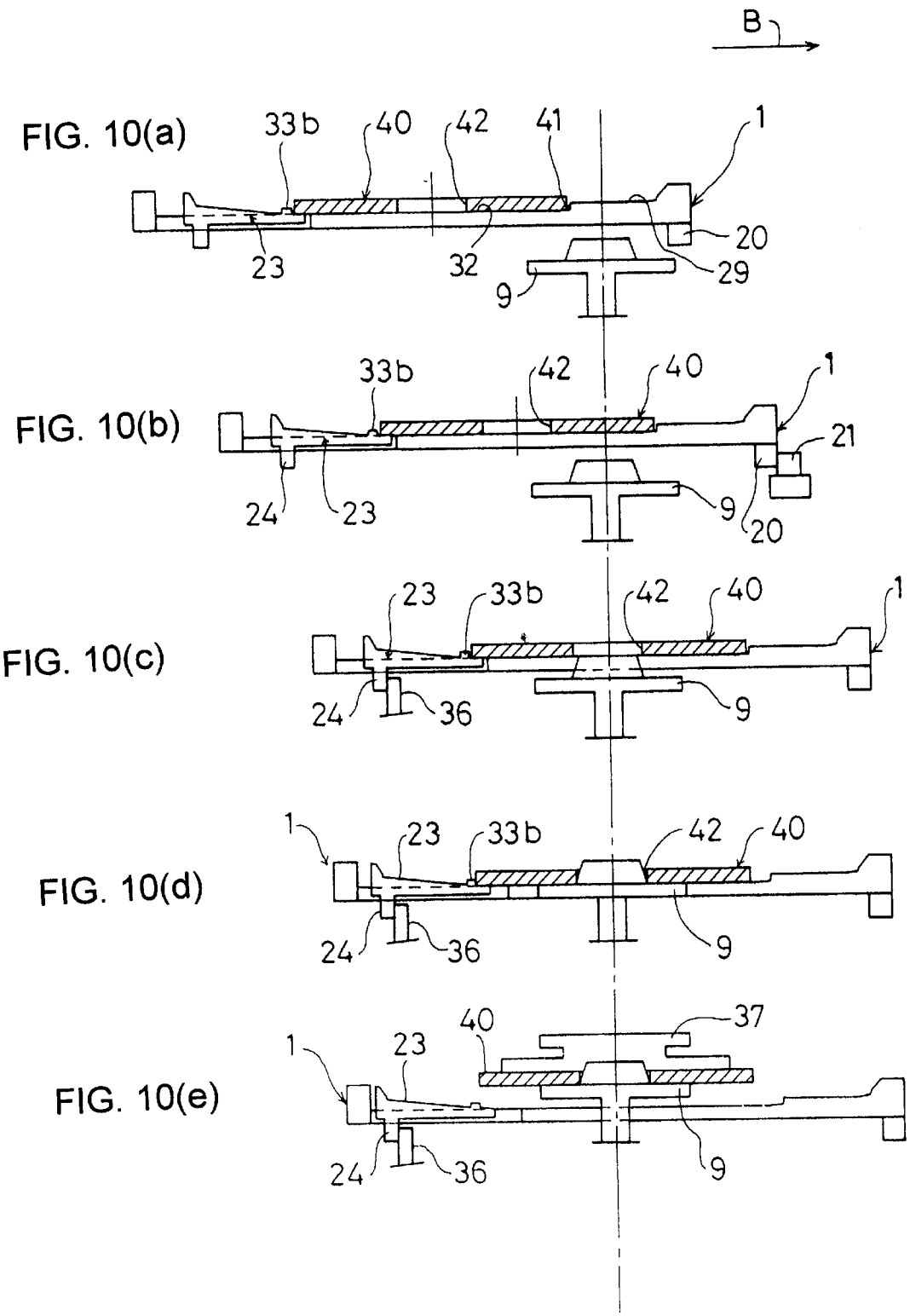
FIG. 10 is a sectional view showing the relationship between the tray, the disc and the turntable observed while a small-diameter disc is being loaded according to the same embodiment.
Figure 11:
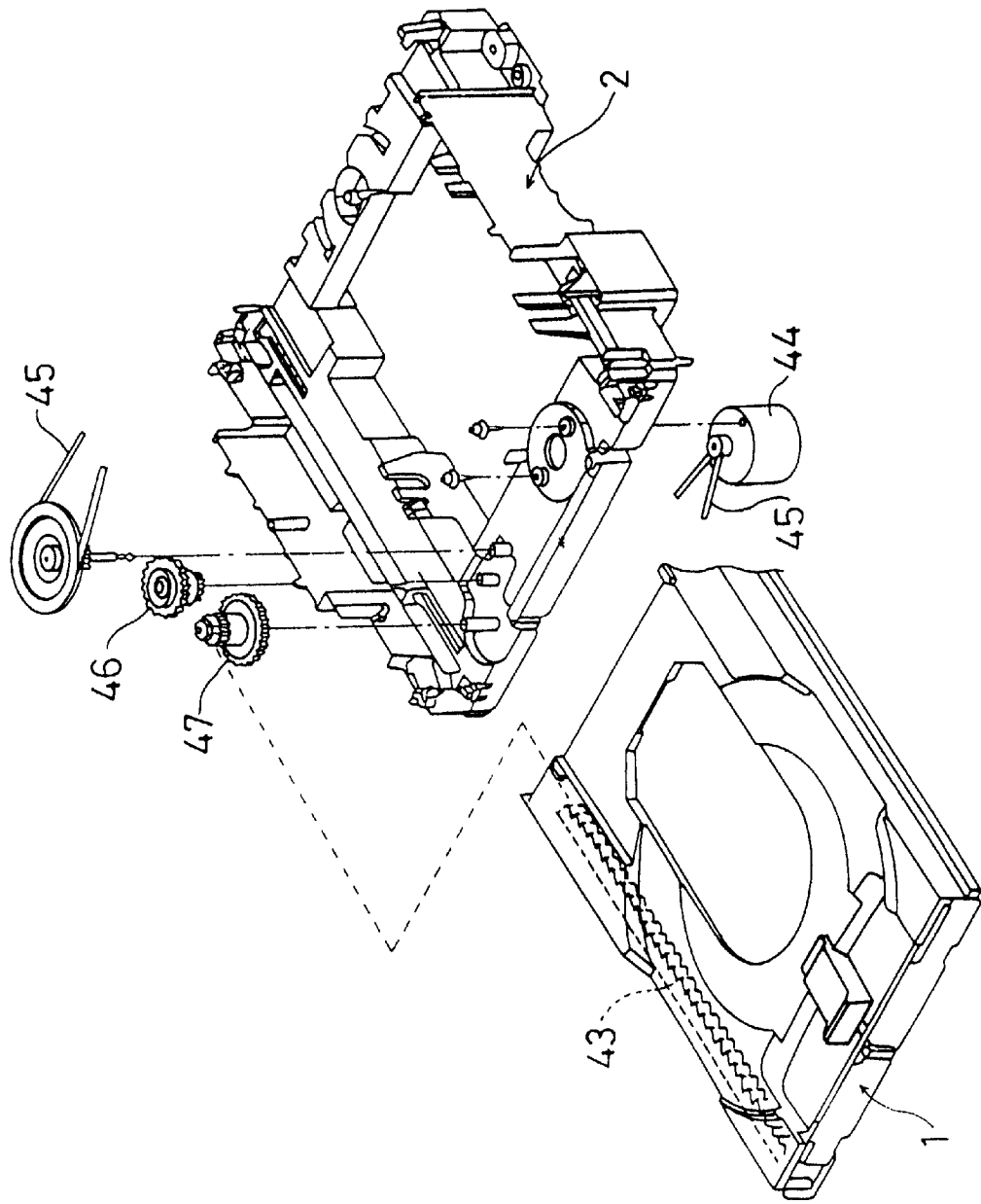
FIG. 11 is an exploded perspective view according to another embodiment.

Therefore, as shown in FIG. 9 of this embodiment, the center 38 of the small-diameter disc receiving portion 32 in the tray 1 is located closer to the internal end than the center 39 of the large-diameter disc receiving portion 29 in order to enable the small-diameter disc to be loaded stably.

By offsetting the centers 38 and 39 of the small- and large-diameter disc receiving portions 32 and 29 from each other in this manner, the center of the turntable 9 aligns with the central hole of the disc despite the movement of the tray 1, thereby enabling stable loading.

FIGS. 10(a) to (e) show a process for loading a small-diameter disc 40 which corresponds to the process for loading the large-diameter disc 34 as shown in FIGS. 8(a) to (e).

In FIG. 10(a), a receiving portion 33b of the disc receiving member 23 positions the front surface of the small-diameter disc 40, while a step 41 between the large- and small-diameter disc placement surfaces 30 and 31 of the tray 1 positions the rear surface of the small-diameter disc.

Next, the playing apparatus 8 starts to elevate in the state as shown in FIG. 10(b).

Since the small-diameter disc 40 is located below the large-diameter disc 34, the central hole 42 of the small-diameter disc 40 aligns with the center of the turntable 9 as shown in FIG. 10(c) before the position shown in FIG. 8(c) is reached. The playing apparatus 8 slightly elevates to align the bottom surface of the small-diameter disc 40 with the top surface of the turntable 9.

Since the tray 1 moves from the position shown in FIG. 10(c) to the position shown in FIG. 8(c), the center 38 of the small-diameter disc receiving surface 31 is correspondingly located closer to the internal end of the tray 1 than the center 39 of the large-diameter disc receiving surface 30.

In addition, the protrusion 24 of the disc receiving member 23 abuts on the engaging piece 36 of the base 2. Then, when the tray 1 is further pushed in toward the internal end in this state, the relative position between the disc receiving member 23 and the tray 1 changes against the urging force of the spring 25, as shown in FIG. 10(d). Consequently, the position of the disc receiving member 23 remains unchanged despite the further pushing-in of the tray 1.

The position in FIG. 8(c) is only a passing point for the small-diameter disc 40. Furthermore, this is also applicable to the position for the large-diameter disc in FIG. 8(d). Since the small-diameter disc is located below the large-diameter disc, the position at which the turntable 9 is located under the bottom surface of the small-diameter disc 40 is before the position in FIG. 8(d). Again, the centers are prevented from mutual offset because the position of the disc receiving surface remains unchanged.

Furthermore, at the position in FIG. 10(e), the damper 37 sandwiches the small-diameter disc 40 so as to enable it to be played.

The ejection process is similarly executed in the reverse order, and despite its movement during the lowering of the turntable 9 from FIGS. 10(e) to (d), the tray 1 can be returned to a predetermined position because the position of the disc receiving surface remains unchanged.

As described above, the centers of the large- and small-diameter disc receiving surface are mutually offset to allow the center of the turntable 9 to align with the central hole of the disc for operation despite the movement of the tray.

In the above embodiment, the tray 1 is manually pushed in from the disc installation and removal position to the loading position against the urging force of the tension spring 3, and the disc is removed by using this urging force to return the tray 1 to the disc installation and removal position. Similar effects, however, can be obtained using a configuration in which a rack 43 formed in the tray 1 is driven by a motor 44 via a belt 45 and gears 46 and 47.

What is claimed is:

1. A disc transfer device, comprising:

a base including an engaging member;

an elevating mechanism for elevating and lowering a turntable in response to a sliding motion of a tray to allow the turntable to engage or disengage a disc on the tray; and a disc receiving member provided at a front end of said tray and being freely slidable in a direction in which the tray slides for urging an internal end of the tray, the disc receiving member having a positioning protrusion for abutting an outer circumference of a disc being placed on the tray;

wherein when a central hole of a disc placed on the tray reaches a position over a central axis of the turntable, the disc receiving member abuts the engaging member of the base to stop the movement of the disc and the tray is moveable toward the internal end thereof.

2. The disc transfer device according to claim 1, wherein the tray has a small-diameter disc receiving portion formed by constructing in a large-diameter disc receiving portion a receiving surface lower than a large-diameter disc receiving surface, the disc receiving member has a large- and small-diameter disc positioning protrusions formed thereon, and the center of the small-diameter disc receiving portion is offset from the center of the large-diameter disc receiving portion toward the internal end of the tray.

* * * * *